Feb. 20, 1934.  J. F. LOUGHLIN  1,948,271
INOCULATING DEVICE
Filed Aug. 13, 1932
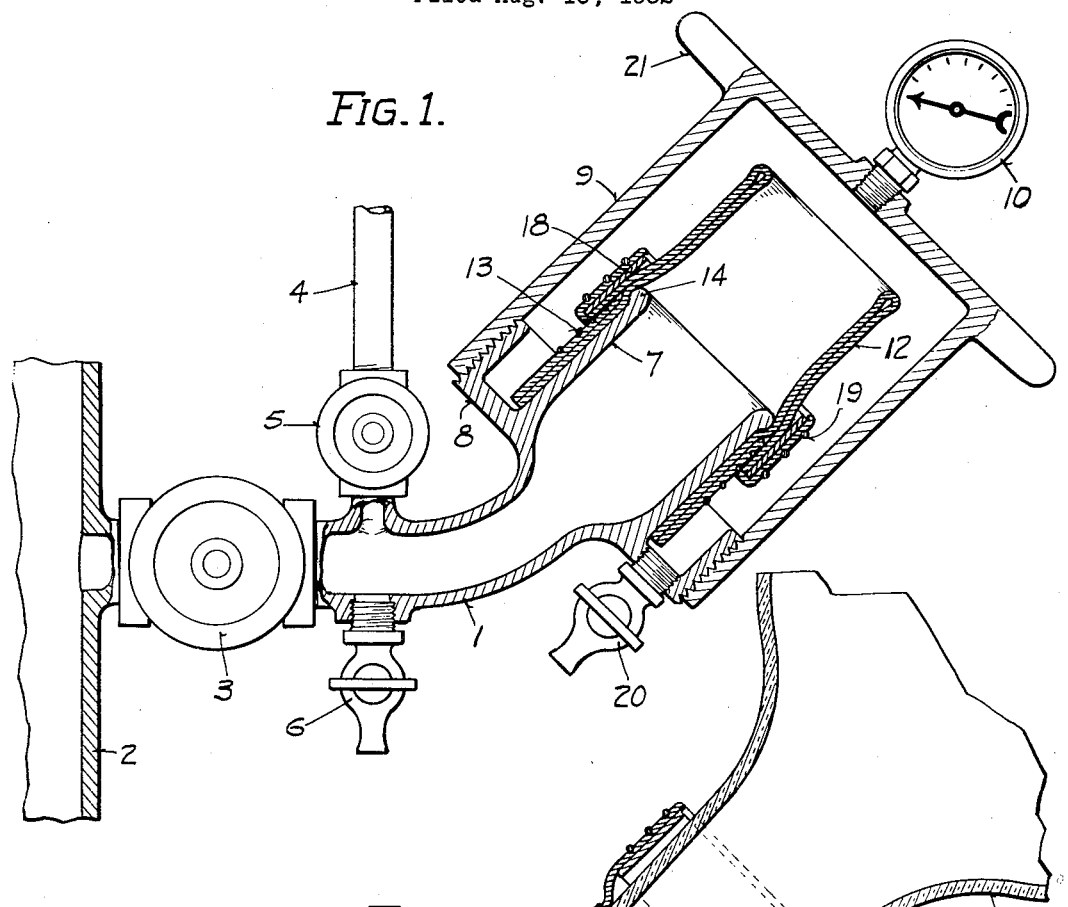
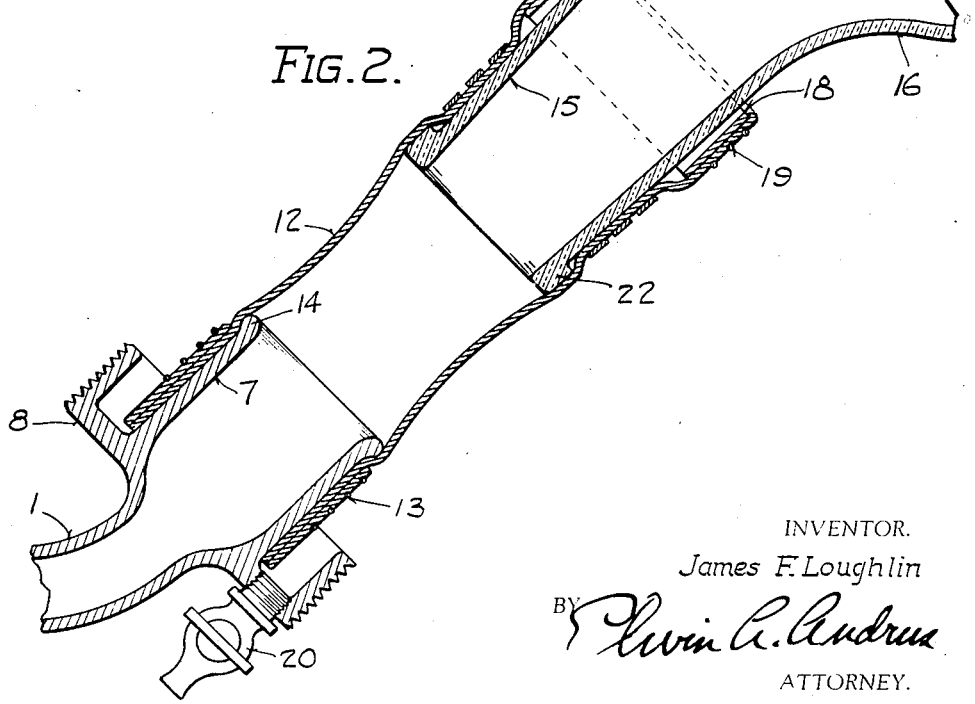
INVENTOR.
James F. Loughlin
BY
ATTORNEY.

Patented Feb. 20, 1934

1,948,271

UNITED STATES PATENT OFFICE 1,948,271

INOCULATING DEVICE

James F. Loughlin, Milwaukee, Wis., assignor to A. O. Smith Corporation, Milwaukee, Wis., a corporation of New York Application August 13, 1932. Serial No. 628,651

6 Claims. (Cl. 23—252)

The invention relates to devices employed in bacteriological and fermentation processes and especially to devices for inoculating mashes or mediums which are to be subjected to such processes.

In the preparation of relatively large volumes of pure cultures and of other mediums which are to be fermented or subjected to the action of organisms, it is found to be necessary in some and desirable in others to isolate the prepared or sterilized mash or medium in order to avoid contamination by other organisms which may be derived from the atmosphere and other contact materials likely to carry contaminants or infections. For example, in preparing large volumes of cultures, it becomes necessary at some point in the procedure to transfer a volume, say five liters of seed from a laboratory flask to a somewhat larger volume of material which is to be inoculated without contamination. The transfer requires rapid manipulation under sterile conditions. When the material or medium in the tank is suitably prepared or sterilized, it is inoculated, and it is one of the objects of the present invention to provide for inoculating in a manner which will permit of rapid inoculation.

Another object of the invention is to provide for sterilization and for maintaining the desired freedom from contamination until and during inoculation.

The invention will be described with reference to an illustrative embodiment thereof shown in the drawing in which:

Fig. 1 is a side elevational view of an inoculating device showing parts broken away, and Fig. 2 is an enlarged cross-sectional view of parts of the device illustrating the disposition of the parts during inoculation.

The inoculator comprises a conduit 1 that is adapted to be mounted on a tank 2 which contains the medium to be inoculated. A valve 3 for opening and closing the connection to the tank is preferably mounted as near the tank as possible so as to avoid spaces where contamination may accumulate. A branch conduit 4 which is connected to a source of pressure steam or other sterilizing material through the shut-off valve 5, branches from the conduit near the valve 3 and a stop-cock 6 branches from the lowest point of the conduit 1 to vent and drain the same. An enlargement 7 of the conduit is made near the outer end and it extends through the base member 8 of a receptacle which is closed by screwing the internally threaded cap 9 onto the base or otherwise sealing the closure onto the receptacle. The base member 8 and the conduit 1 may consist of a single casting in which the end portion 7 constitutes a nipple which projects into the enclosure of the receptacle. In sterilizing with steam under pressure, a pressure gauge 10 may conveniently be mounted on the receptacle to indicate that the necessary pressure and temperature for complete sterilization is present. The conduit 1 is preferably, but not necessarily, curved upwardly so as to dispose the receptacle at an angle to the horizontal for quickly draining its contents.

A sealing member, such as the rubber hose 12 is mounted on the end of the nipple member 7. The hose is preferably secured to the nipple by tying a wire 13 or clamping around the outside of the hose and the fastening may be made more secure by forming a slight enlargement or flange 14 at the end of the nipple member 7.

As shown in Fig. 2, the hose 12 is made long enough to form a secure connection when the neck 15 or other connection of a culture receptacle 16 is inserted in the hose so as to dilate the hose and provide a short length, say two or three inches which will permit the culture flask to be manipulated and tipped to discharge its contents through the hose 12 and conduit 1 into the tank 2. The manipulation in which the culture flask is connected to the hose 12 and discharged into the hose, must be done rapidly and under sterile conditions to avoid contamination from the hands of the operator and the like. Means are provided in the outer end of the hose for this purpose.

A guide ring 18, which may be composed of steel or other self-supporting material, is made large enough to slide over the flange 14 and to encircle the nipple 7 when the hose is folded back externally upon itself. The guide ring is mounted on the end of the hose with its outer edge flush with the end of the hose and securely fastened in place by tying or clamping the wires or cord 19 around the outside.

The tank 2 is preferably, but not necessarily, filled with sterile gas under pressure, say 1 or 2 pounds pressure, and when an inoculation is to be made, a small amount of this air may be passed from the tank through the inoculator by slightly opening valve 3. The operator removes the closure 9 and brings the hose 12 from its folded position as shown in Fig. 1 into the elongated position as shown in Fig. 2. This is done by grasping around the outside of the hose 12, thereby preserving the sterility of the inside surfaces of the ring 18 and the hose connector. The flamed or sterilized neck 15 of the laboratory flask 16 is quickly inserted through the ring 18 into the hose and is preferably secured therein by passing a tape tightly around the outside of the hose between the ring 18 and the flange 22 of the inoculating flask 16. The valve 3 is then opened to establish communication with the tank 2 and the flask 16 is turned upside down. When the culture is discharged into the tank 2, the valve 3 is closed and the flask is removed.

The device may be thoroughly cleaned by flushing with water and permitting the same to drain through the stop-cock 6 and the stop-cock 20 which is disposed to open from the lowest part of the receptacle. The hose 12 is then folded back into the position shown in Fig. 1 and held in place by the friction of the guide ring which engages the covered end of the nipple 7. With the hose in this position, the inner surface of the hose 12 is exposed to the action of the sterilizing material. By folding and shortening the projecting hose, a receptacle with the minimum of inner exposed surface can be used and the hose becomes reenforced so that it will stand free of the receptacle and permit free circulation of sterilizing material. The cover 9 is screwed down on the base 8 by means of the handles 21 and the device is ready to be sterilized.

It is convenient to sterilize the inoculator shortly before an inoculation is to be made. The tank 2 and valve 3 having been sterilized, the valve 3 is closed. In sterilizing the inoculator, the stop-cock 6 is closed, stop-cock 20 is opened, and steam or other sterilizing material is admitted from pipe 4 by opening the valve 5. The material passes through conduit 1, through and around the nipple 7 and hose 12, and into the interior of the receptacle. In sterilizing with steam, the inoculator is commonly sterilized under pressure by partly closing the stop-cock 20. By regulating the supply and discharge of steam, any desired steam pressure can be maintained in the receptacle until the inoculation is ready to be made. When the sterilization is finished, the material or steam condensate is drained through stop-cock 6 and 20 and the stop-cocks are closed.

Although the invention has been described with reference to a specific embodiment thereof, it is to be understood that it is not limited thereto. Various modifications, such as using a longer receptacle and not folding back the hose 12, can be made without departing from the invention. No limitations are intended in the annexed claims except those which are specifically recited or are imposed by the prior art.

I claim:

1. An inoculating device which comprises a receptacle having a base, a tubular member on the base having an extension projecting into the enclosure of said receptacle and forming a communication between said enclosure and a container for material which is to be inoculated, a removable closure for retaining contents of the receptacle under pressure, means for supplying sterilizing material, and means for venting said tubular member and receptacle.

2. An inoculating device which comprises a base, a cap removably mounted on the base, said cap being shaped to form an enclosure with the base, a tubular member on the base having an extension projecting into the enclosure and forming a communication between said enclosure and a container for material which is to be inoculated, means for sterilizing the tubular member and cap, and a sealing member on said extension for forming a sealed connection between a culture container and said tubular member.

3. An inoculating device which comprises a base, a cap removably mounted on the base, said cap being shaped to form an enclosure with the base, a tubular member on the base having an extension projecting into the enclosure and forming a communication between said enclosure and a container for material which is to be inoculated, a tubular member on said extension adapted and arranged to be dilated to form a sealed connection between a culture container and said tubular member and means on the tubular member to introduce material for sterilizing the tubular member and contents of the cap.

4. An inoculating device which comprises a receptacle having a base, a tubular member connecting the enclosure of the receptacle with a container for material which is to be inoculated, an extension on said tubular member projecting into said enclosure, a flexible tubular member on said nipple, means for dilating an end portion of said flexible member, and a removable closure for the receptacle.

5. An inoculating device which comprises a receptacle having a base, a tubular member connecting the enclosure of the receptacle with a container for material which is to be inoculated, a valve in the tubular member for closing said connection, a valve controlled branch connecting said tubular member and a source of sterilizing material, a valve controlled vent connecting with the lowest point in said tubular member, a vent for said receptacle, an extension on said tubular member projecting into said enclosure, and a removable closure for the receptacle.

6. An inoculating device which comprises a tubular conduit, a valve on one end adapted to regulate communication with a container for material which is to be inoculated, a receptacle on the other end having a base through which the conduit is extended to project into the enclosure thereof and provide a nipple member, means branching from the conduit near said valve for supplying sterilizing material to said conduit and receptacle, a valve controlled vent branching from the lowest level of said conduit, means on said nipple member for forming a sealed connection between a culture container and said conduit, a removable closure for said receptacle, and means to rid said receptacle of sterilizing material and maintain sterility of the contents thereof.

JAMES F. LOUGHLIN.